April 7, 1925.

H. H. SMITH

APPARATUS FOR MAKING GAS

Filed Feb. 5, 1921

H. H. SMITH

APPARATUS FOR MAKING GAS

Filed Feb. 5, 1921 2 Sheets-Sheet 2

Inventor
Harold Hardy Smith
By his Attorneys
Williams & Pritchard

Patented Apr. 7, 1925.

1,532,451

UNITED STATES PATENT OFFICE.

HAROLD HARDY SMITH, OF WOOLWICH, SYDNEY, AUSTRALIA, ASSIGNOR TO MINERALS SEPARATION NORTH AMERICAN CORPORATION, OF NEW YORK, N. Y., A CORPORATION OF MARYLAND.

APPARATUS FOR MAKING GAS.

Application filed February 5, 1921. Serial No. 442,628.

*To all whom it may concern:*

Be it known that I, HAROLD HARDY SMITH, a subject of the King of Great Britain, and a resident of Woolwich, Sydney, Australia, have invented certain new and useful Improvements in Apparatus for Making Gas, of which the following is a specification.

This invention relates to the production of gas and is herein disclosed as a continuation in part of my copending application, Serial No. 399,040, filed July 26, 1920, in which is set forth a method of treating ores for froth flotation purposes and the process of manufacturing a gas for so treating them. The gas so produced consists largely of hydrogen sulphide carrying carbon dioxide and some other substances in gaseous or vapor form.

According to the form of the invention herein specifically disclosed the process of producing the hydrogen-sulphide-containing gas desired may be worked as a continuous process. For this purpose it is advantageous to have the material finely ground, since the reactions, to a large extent at least, seem to be in the nature of surface reactions. Moreover, to avoid an evolution of sulphur at the beginning of the reactions it is usually desirable to begin the reactions at a zone of low heat and to gradually raise the heat to the maximum temperature desired and to discharge the gases produced from the hottest end of the zone of reaction. This enables any deleterious results to be avoided which might arise from passing over free sulphur or over relatively cooler sulphur-bearing material, the hydrogen-sulphide-bearing gas which has been formed. To obtain this result the material may be fed in at one end of a retort through which it is fed continuously, and which is heated to say 700° or 800° centrigrade at its exit end and to a good deal lower temperature at its admission end. Apparently a temperature of 300° to 400° centigrade at the admission end will usually prove satisfactory. The desired gas is obtained by passing steam with the finely ground material through the retort so that the desired reactions take place. The material used may well be the concentrate obtained by the froth flotation concentration process, or free sulphur itself finely ground or in the form of a fine powder and mixed with sufficient inert material so that the charge contains preferably in the neighborhood of 30 per cent or less of available sulphur. Where froth flotation concentrates are used as a source of sulphur the gangue present in them will usually serve as the desired inert material. With the sulphur-bearing material is mixed finely ground carbon, preferably in the form of charcoal, up to an extent sufficient to insure the desired reactions taking place. The quantity of carbon required will vary with the nature of the charge and is best determined by experiment. But for charges carrying 25 to 30 per cent sulphur in the form of metallic sulphides, 10 per cent of carbon on the charge has been found satisfactory in small units or retorts and apparently less is needed in large retorts or units. A large excess of carbon seems objectionable as increasing the production of hydrogen or carbon-monoxide or both, these usually seeming for the most part diluents of the hydrogen sulphide. Moreover a large production of hydrogen and carbon-monoxide seems to involve waste of the heat used in maintaining the retort at proper temperature.

Other features and advantages will hereinafter appear.

In the accompanying drawings.

Figure 1:
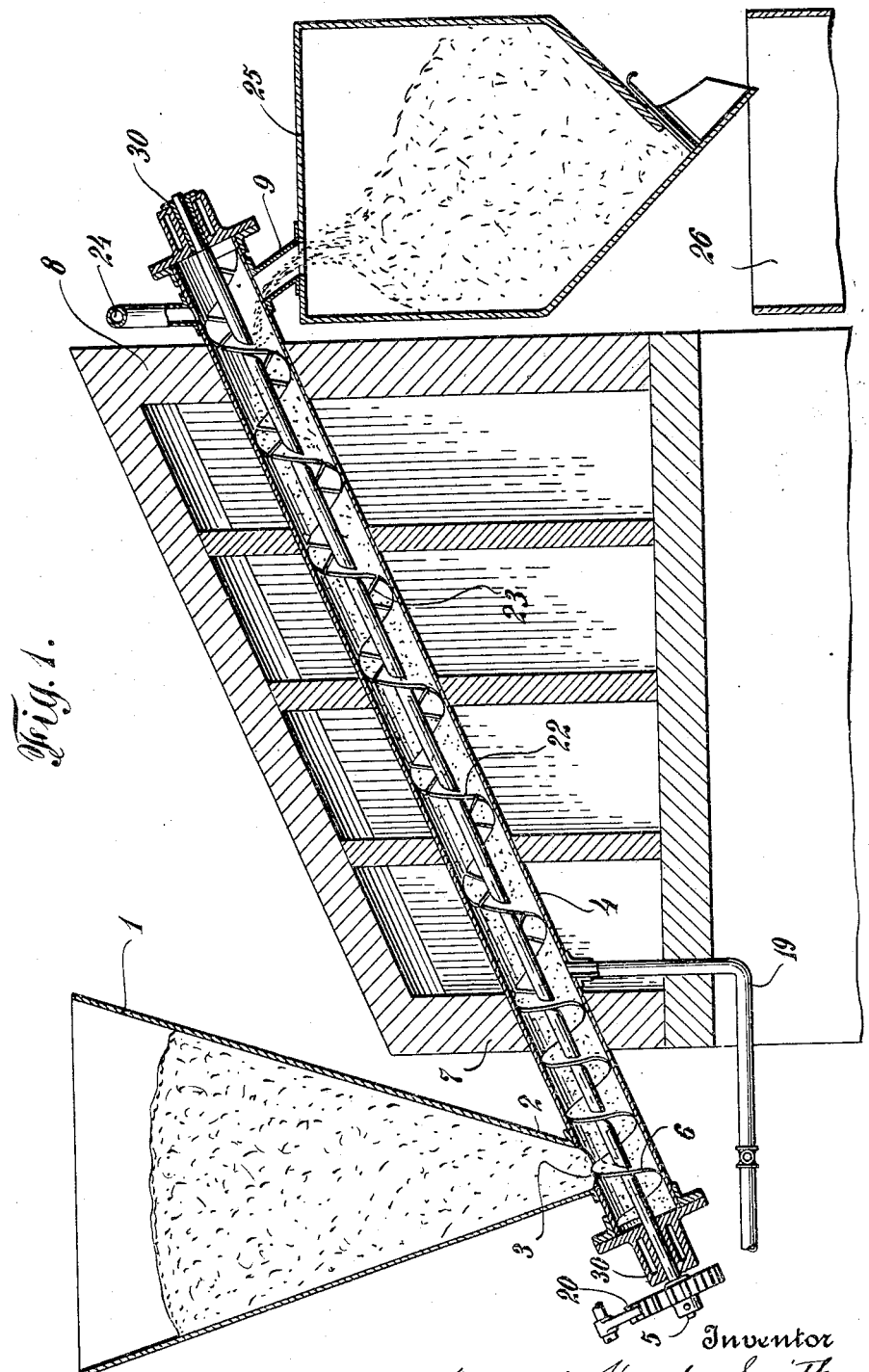
Figure 1 is a diagrammatic sectional side view of an apparatus for carrying out the present invention.

The finely ground charge, usually in the form of sulphide of iron or in the form of froth flotation concentrates of sulphide of copper or sulphides of copper and iron, together with the intimately mixed finely ground charcoal, is fed into a hopper 1 having a lower exit end 2, which opens at 3 into a retort 4. The retort 4 is preferably so placed that the point of discharge is higher than the main body of the retort. This ensures that the charge fills the whole diameter of the retort for at least quite a distance with the result that the steam and gases are forced through the charge instead of escaping past it at the periphery of the retort. The charged retort may therefore be called self-sealing. The retort is here shown as inclined upward from the end 2 of the hopper 1 and is provided with a suitable feeding device shown as a central shaft 5 on which is fastened a suitable feed screw 6 for feeding through the retort the charge of material from the hopper 1. The retort, which may be some six or nine feet long within the furnace walls 7 and 8, is usually heated to a higher temperature at its upper end near the discharge opening 9, than it is elsewhere heated.

Figure 2:
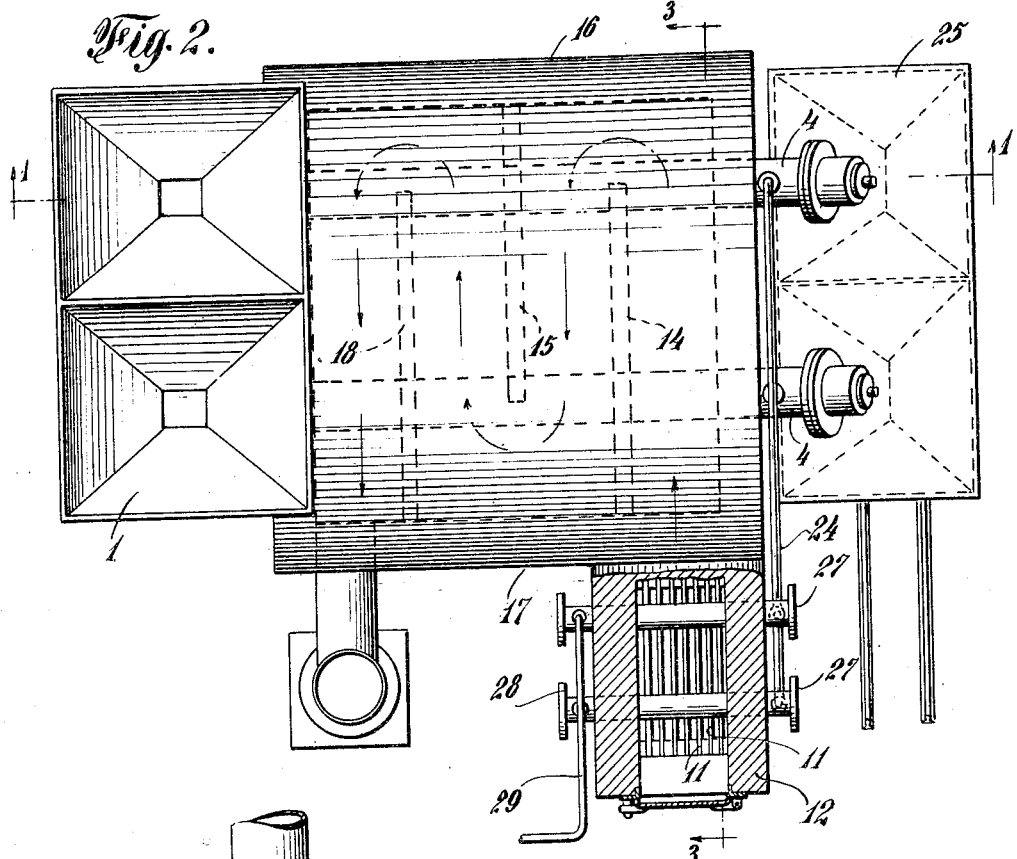
Figure 2 is a plan view of the same.
Figure 3:
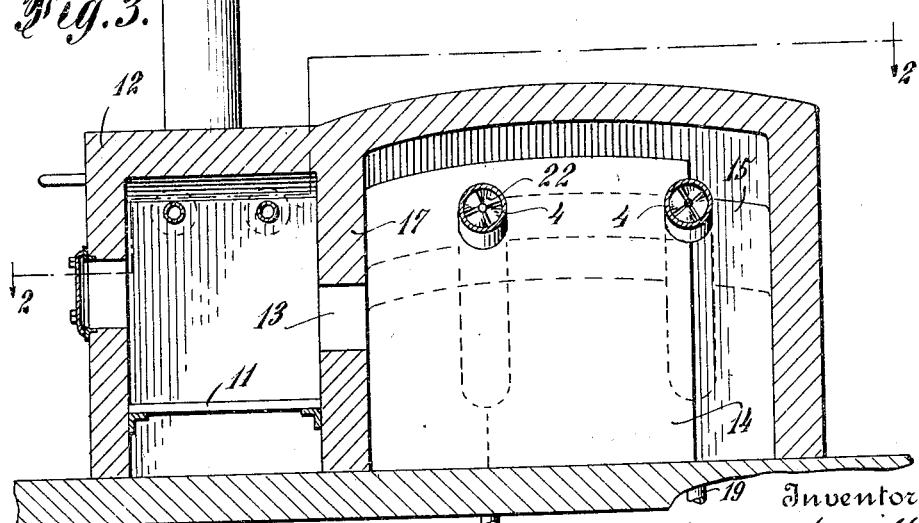
Figure 3 is a sectional end view.

For this purpose there is provided a fire-box having grate bars 11, located within suitable walls 12, so that fuel burning upon the grate bars 11 discharges hot gases part way up one of the side walls through an opening 13 near the upper end of the retort 4. The hot gases and products of combustion from the fire-box are carried past the retort shown in Figure 1 and any other of the plurality of retorts which usually make up an operating unit, two being shown in Figures 2 and 3. For thus carrying the hot products of combustion past the upper ends of all the retorts there is provided a baffle wall 14 which extends across the furnace between the walls 7 and 8 far enough to carry the hot products of combustion past the retort 4 most remote from the fire-box. The baffle wall 14, like the other baffle walls hereinafter described, may be built of loose brick to facilitate the tearing down of the retorts for repairs or other purposes as occasion may arise. After the hot products of combustion have passed the last retort 4 they are carried back past that retort and all the other retorts to the first retort because a second baffle wall 15 extending from the end wall 16 of the furnace carries them toward the end wall 17 nearest the grate bars 11, with the result that the retorts are again heated by the products of combustion, although to a less degree than at their upper ends.

For the purpose of progressively heating the retorts toward their ends to a suitable extent there are provided as many more baffle walls 18 as may be necessary in addition to the walls 14 and 15, only one such wall 18 being illustrated.

With the structure just described, it is possible to heat the upper ends of the retorts substantially to 700° or 800° centigrade, and the lower ends to 300° to 400° centigrade, thus obtaining the heating which seems most effective.

In order to obtain the desired reactions, steam is supplied in some form, either by feeding the charge wet with the requisite amount of water or by a valved steam pipe 19 carried within the walls 7 to the retort, so that the proper amount of water vapor to produce hydrogen sulphide may be furnished. By having the steam pipe 19 well within the furnace wall 7, a desirable dryness of the steam may be assured. This separate supplying of steam enables the charge to be fed dry, which is sometimes advantageous. In order to feed the material in the desired way and to obtain the proper mixture of it, the screw 6 may be driven comparatively slowly by a pawl and ratchet device 20, and the screw may be suitably constructed to suit the purpose in hand.

As herein illustrated, the screw 6 has a comparatively small pitch outside the wall 7 as shown at 21. Within the wall 7 the spiral has a larger pitch, as shown at 22. To insure continuous and proper mixing of the various ingredients of the charge, the spiral may have slots or openings 23, suitably located so that though the spiral as a whole feeds the charge forward a part of the charge is always being stirred at each one of the slots or openings 23 by slipping past the edges of the slot, while a good part of the material of the charge is fed on by the adjacent solid portion of the spiral. The amount of steam and rapidity of the feeding and the heating are so adjusted that the gas discharged from the pipe 24 at the upper end of the retort, and usually outside the wall 8, consists very largely of hydrogen sulphide and carbon dioxide, carrying as little other sulphur compounds as the exigencies of efficient working will permit. The exhausted sulphide and other material discharged from the top of the retort through the exit 9 falls into a closed hopper 25, from which it may be removed at intervals in suitable wagons 26, or otherwise.

For the purpose of improving the quality of the gases produced it is advantageous to bring them into contact with a material such as lime or impure lime, which is heated to usually about the same temperature as the upper ends of the retorts, with the apparent result that sulphur vapor carried by the gases reacts with the other gases or vapors present either to produce useful hydrogen sulphide, or to produce substances which are at least comparatively inoccuous for the flotation separation processes or other processes for which the gas may be used. To obtain this result, the gases carried by the pipe 24 are shown as carried to lime retorts 27 extending across the upper part of the fire-box considerably above the side opening 13, so that the lime retorts 27 are heated only by the radiant heat from the fire on the grate bars 11, and from the radiant heat of the products of combustion. For this purpose the lime retorts may be supported mainly or largely in the walls 12 of the furnace and may be extended outside the walls 12 and be provided with suitable closures 28 to enable them to be cleaned or the lime material to be replaced as desired. From the lime retorts 27, the gas is carried by the pipe 29 for further treatment, or storage, or for immediate use, as the case may be. The pipe 24 is advantageously maintained at such a high temperature that sulphur will not condense in it, and for this purpose in some climates at least it will be found necessary to carry it within the muffle wall or to provide it with a covering of heat-insulating material.

The retort may be provided with suitable gas-tight packing glands 30, which serve to support the shaft 5, which carries the spiral feed device 6.

The apparatus above described is one example of the embodiment of my invention, and it is obvious that various modifications may be made within my invention.

I claim:—

1. The combination with a retort shell, of a fire-box in which fuel is burned for heating the shell, means for feeding material to the retort, means for conducting products away from the retort, baffles for causing one end of the retort to be heated more highly than the other by the fire-box, and a treating device through which the gases pass for treating the gases coming from the retort also heated by said fuel.

2. The combination with a retort shell having one end substantially higher than the other, of a fire-box removed from the shell, means for feeding material to the lower end of the retort, means for removing products at the upper end of the retort, and baffles for conducting the products of combustion to heat the upper part of the retort, and for heating the remainder of the retort to a less degree and a retort device at the fire-box through which the gases pass for treating gases coming from the retorts.

3. The combination with a retort shell having one end substantially higher than the other, of a screw for feeding fine material through the retort and mixing it, a self sealing tube for feeding the material to the lower end of the retort, a gas tight tube exit for the solid products, a pipe for the other products, a fire-box in which fuel is burned for heating the retort, and a treating device through which said other products pass also heated by said fuel.

In testimony whereof, I have affixed my signature to this specification.

HAROLD HARDY SMITH.